(12) United States Patent
Yamamoto et al.

(10) Patent No.: US 12,725,892 B2
(45) Date of Patent: Sep. 1, 2026

(54) POWER STORAGE CELL

(71) Applicant: TOYOTA JIDOSHA KABUSHIKI KAISHA, Toyota (JP)

(72) Inventors: Satomi Yamamoto, Miyoshi (JP); Masayoshi Haga, Nagoya (JP); Masashi Chihara, Nagoya (JP); Takenori Ikeda, Owariasahi (JP); Nana Kurashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 18/503,767

(22) Filed: Nov. 7, 2023

(65) Prior Publication Data

US 2024/0162585 A1 May 16, 2024

(30) Foreign Application Priority Data

Nov. 10, 2022 (JP) ................................ 2022-180229

(51) Int. Cl.

| | |
|---|---|
| ***H01M 50/578*** | (2021.01) |
| ***H01M 50/103*** | (2021.01) |
| ***H01M 50/15*** | (2021.01) |
| ***H01M 50/55*** | (2021.01) |
| ***H01M 50/553*** | (2021.01) |

(52) U.S. Cl.

CPC ....... *H01M 50/578* (2021.01); *H01M 50/103* (2021.01); *H01M 50/15* (2021.01); *H01M 50/55* (2021.01); *H01M 50/553* (2021.01); *H01M 2200/20* (2013.01)

(58) Field of Classification Search

CPC .. H01M 50/578; H01M 50/55; H01M 50/553; H01M 10/445; H01M 2200/20

See application file for complete search history.

(56) References Cited

U.S. PATENT DOCUMENTS

2015/0236333 A1* 8/2015 Guen .................... H01M 10/42 429/61
2015/0295222 A1 10/2015 Kwak

FOREIGN PATENT DOCUMENTS

JP 2015-204284 A 11/2015

* cited by examiner

*Primary Examiner* — Christopher P Domone
(74) *Attorney, Agent, or Firm* — Sughrue Mion, PLLC

(57) ABSTRACT

A power storage cell includes: an electrode assembly; a cell case; and an external terminal. The cell case has a case main body and a lid. The lid has a lid main body charged positively or negatively, an inversion plate that is able to short-circuit the lid main body and the external terminal, and a protrusion protruding from the inversion plate toward the external terminal. The inversion plate is deformable between a steady-state shape and an inversion shape, the steady-state shape being a shape curved to project in a direction away from the external terminal, the inversion shape being a shape curved to project toward the external terminal with the inversion plate being in contact with the external terminal. The external terminal has a holding portion that holds the protrusion when the inversion plate is in the inversion shape.

4 Claims, 5 Drawing Sheets

420N(420)
300N(300)
330 340
1
222a
412a
412h
222c
300P(300)
310 320
420P(420)
412 411
410N(410)
220
110N
412a
412h
411 412
410P(410)
110P
111
112
100
120
211
210

226
333
224
300N(300)
342
332
226a
226b
333a
333b
224b
224a
330
340
222
510
333c
226c 226
224
300N(300)
342
335
336
333
334
226b
226a
224b
224a
330
340
222
510

POWER STORAGE CELL

This nonprovisional application is based on Japanese Patent Application No. 2022-180229 filed on Nov. 10, 2022 with the Japan Patent Office, the entire contents of which are hereby incorporated by reference.

BACKGROUND

Field

The present disclosure relates to a power storage cell.

Description of the Background Art

Japanese Patent Application Laid-Open No. 2015-204284 discloses a power storage cell including an electrode assembly, a case for housing the electrode assembly, and a cap assembly to which the case is connected. The case opens upward. The cap assembly includes a cap plate fixed to an opening of the case, a pair of terminal plates connected to an upper surface of the cap plate, and an inversion plate connected to the cap plate. The cap plate is electrically connected to the terminal plate of the positive electrode, and the inversion plate is electrically connected to the cap plate. A terminal plate of a negative electrode is disposed above the inversion plate.

When the inversion plate in the power storage cell is inverted, the inversion plate comes into contact with the terminal plate of the negative electrode. Then, since the terminal plate of the positive electrode and the terminal plate of the negative electrode are short-circuited through the inversion plate and the cap plate, a short-circuit current flows through the inversion plate.

SUMMARY

In the power storage cell described in Japanese Patent Application Laid-Open No. 2015-204284, there is a concern that the inversion plate may be re-inverted in a direction away from the terminal plate due to vibration or the like.

It is an object of the present disclosure to provide a power storage cell to suppress re-inversion of an inversion plate.

An power storage cell according to an aspect of the present disclosure includes: an electrode assembly; a cell case that accommodates the electrode assembly; and an external terminal fixed to an upper surface of the cell case, wherein the cell case has a case main body that accommodates the electrode assembly, the case main body being provided with an opening that opens upward, and a lid connected to the case main body so as to close the opening of the case main body, the lid has a lid main body connected to the opening of the case main body and charged positively or negatively in the electrode assembly, an inversion plate connected to the lid main body, the inversion plate being able to short-circuit the lid main body and the external terminal, and a protrusion protruding from the inversion plate toward the external terminal, the inversion plate is deformable between a steady-state shape and an inversion shape, the steady-state shape being a shape curved to project in a direction away from the external terminal, the inversion shape being a shape curved to project toward the external terminal with the inversion plate being in contact with the external terminal, and the external terminal has a holding portion that is separated from the protrusion when the inversion plate is in the steady-state shape and that holds the protrusion when the inversion plate is in the inversion shape.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
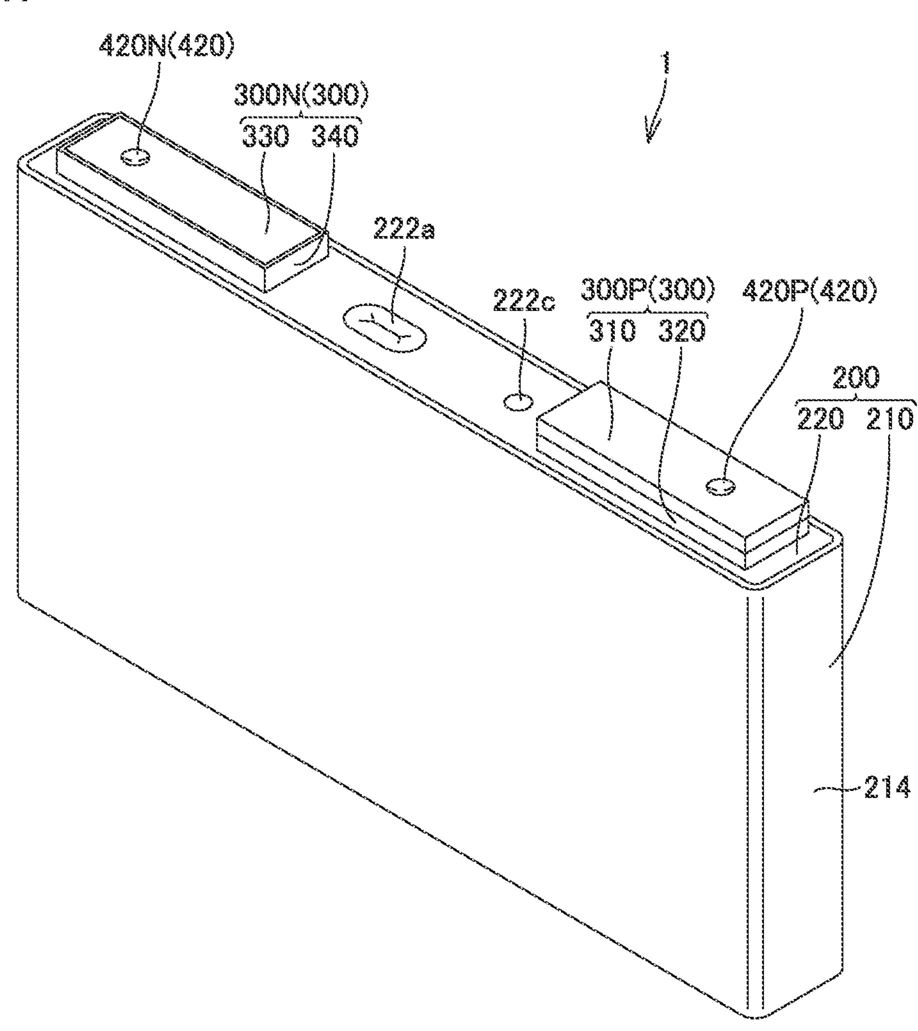
FIG. 1 is a perspective view schematically showing a power storage cell according to an embodiment of the present disclosure.

Embodiments of the present disclosure will be described with reference to the drawings. In the drawings referred to below, the same or corresponding members are denoted by the same reference numerals.

Figure 2:
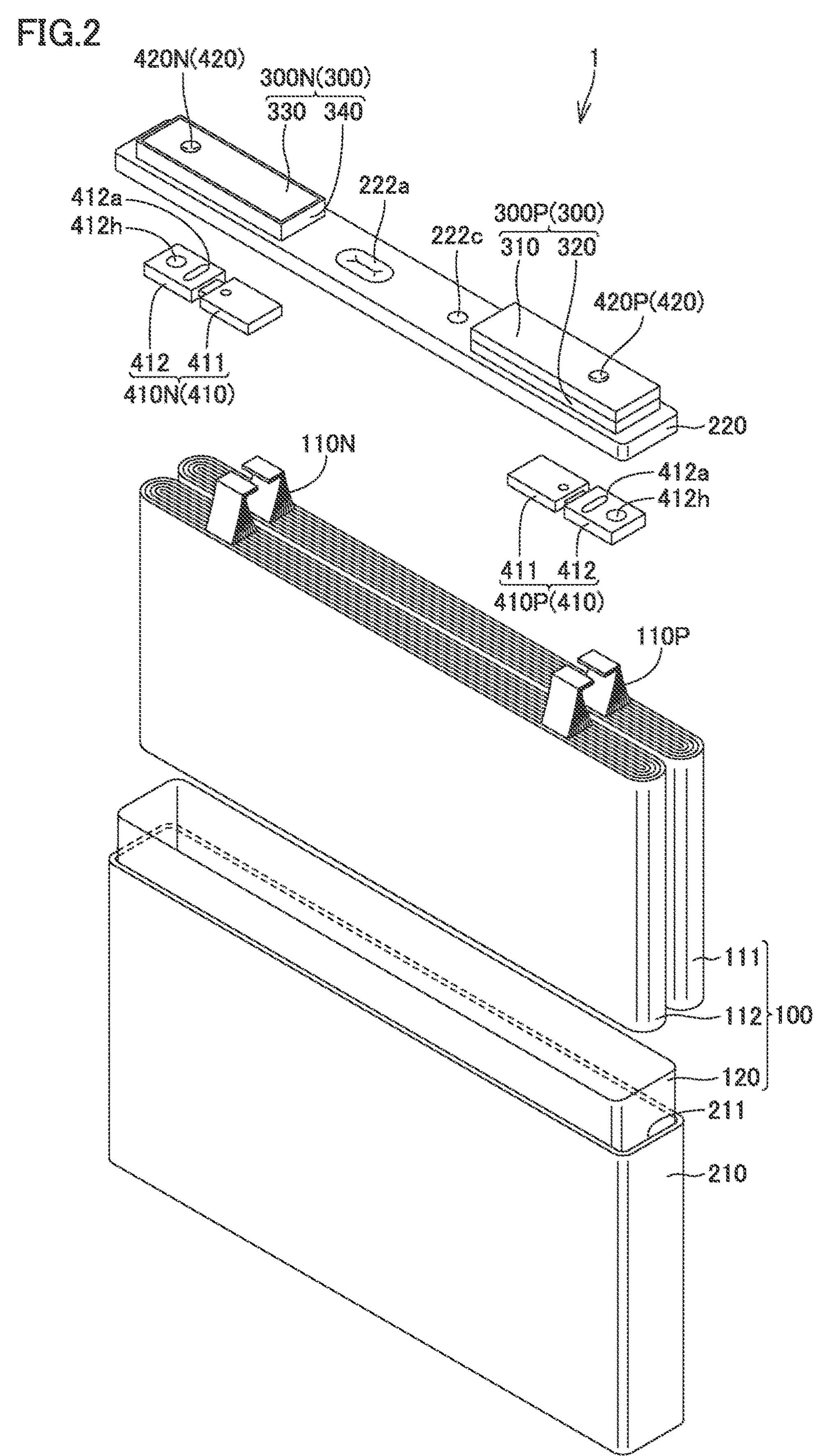
FIG. 2 is an exploded perspective view of the power storage cell shown in FIG. 1.
Figure 3:
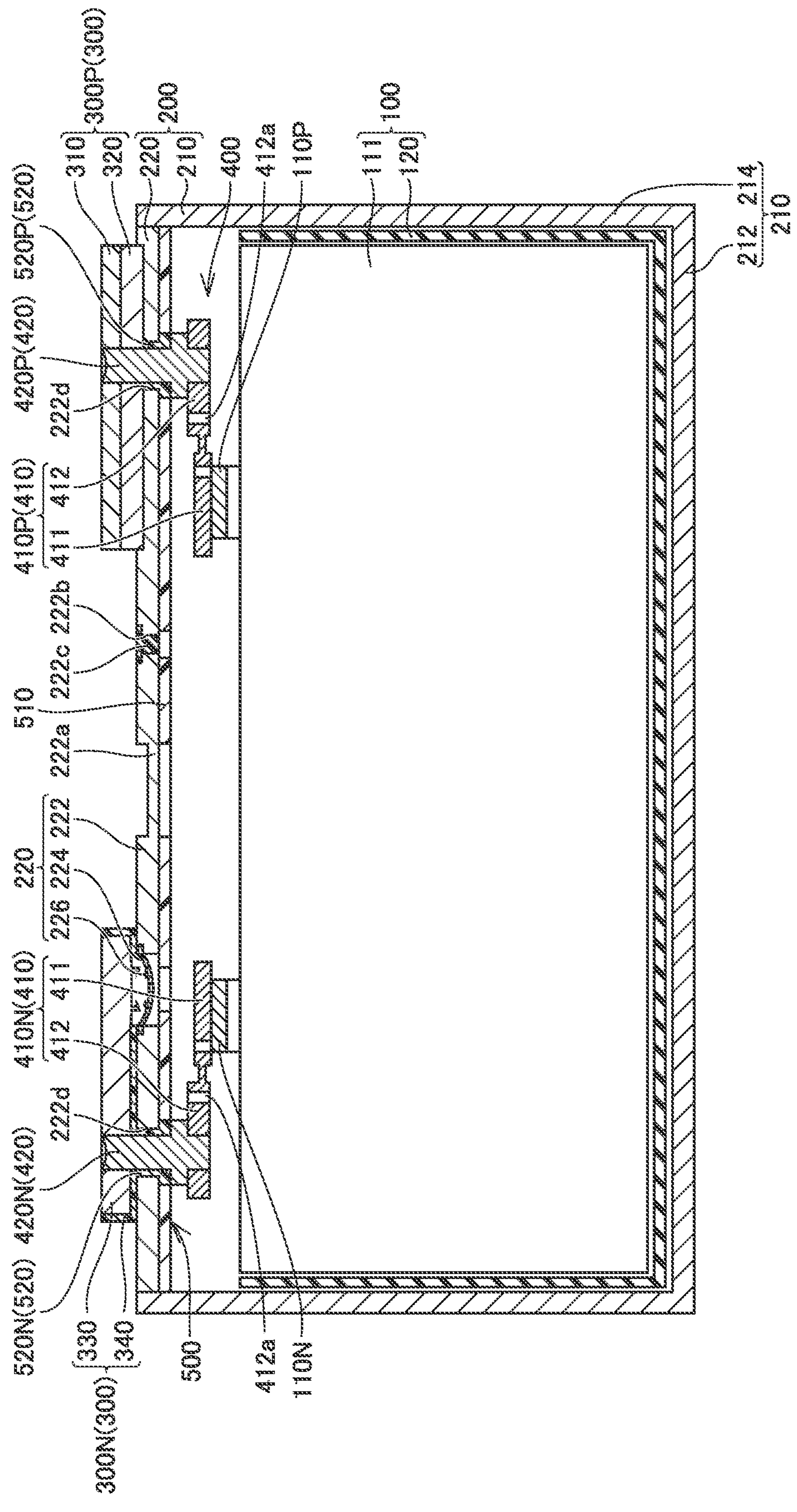
FIG. 3 is a cross-sectional view of the power storage cell shown in FIG. 1.

FIG. 1 is a perspective view schematically showing a power storage cell according to an embodiment of the present disclosure. FIG. 2 is an exploded perspective view of the power storage cell shown in FIG. 1. FIG. 3 is a cross-sectional view of the power storage cell shown in FIG. 1.

As shown in FIGS. 1 to 3, the power storage cell 1 includes an electrode assembly 100, a cell case 200, external terminals 300, a coupling member 400, and an insulating member 500.

The electrode assembly 100 includes a plurality of unit electrode assemblies 111, 112 and an insulating film 120. In the present embodiment, the plurality of unit electrode assemblies includes two unit electrode assemblies 111 and 112. Each of the unit electrode assemblies 111 and 112 includes a plurality of tabs, that is, a plurality of positive electrode tabs 110P and a plurality of negative electrode tabs 110N. The unit electrode assemblies 111 and 112 have the same structure. Therefore, the unit electrode assembly 111 will be described below.

The unit electrode assembly 111 includes a positive electrode sheet, a separator, and a negative electrode sheet. The positive electrode sheet, the negative electrode sheet, and the separator are formed in a long rectangular shape.

The positive electrode sheet includes a metal foil and a positive electrode composite layer provided on the metal foil. An uncoated portion in which a positive electrode composite layer is not formed is formed in the upper long side portion of the metal foil, and the plurality of positive electrode tabs 110P are formed at intervals in the uncoated portion.

The negative electrode sheet includes a metal foil and a negative electrode composite layer formed on the metal foil. An uncoated portion in which the negative electrode composite layer is not formed is formed in the upper long side portion of the metal foil, and the plurality of negative electrode tabs 110N are formed at intervals in the uncoated portion.

In a state in which each sheet is wound, each positive electrode tab 110P is arranged in the thickness direction (a direction orthogonal to the sheet of FIG. 3) and each negative electrode tab 110N is arranged in the thickness direction. The positive electrode tab 110P and the negative electrode tab 110N are arranged at intervals in the width direction (direction orthogonal to both the thickness direction and the height direction).

The insulating film 120 has a shape that collectively covers the peripheral surface and the bottom surface of the plurality of unit electrode assemblies 111 and 112.

The cell case 200 houses the electrode assembly 100. The cell case 200 contains an electrolyte solution (not shown). The cell case 200 is sealed. The cell case 200 includes a case main body 210 and a lid 220.

The case main body 210 has an opening 211 that opens upward. The case main body 210 is made of metal such as aluminum. The case main body 210 includes a bottom wall 212 and a peripheral wall 214. The bottom wall 212 is formed in a rectangular and flat plate shape. The peripheral wall 214 rises from the bottom wall 212. The peripheral wall 214 is formed in a quadrangular cylindrical shape. The length of the peripheral wall 214 in the width direction is longer than the length of the peripheral wall 214 in the thickness direction. The length of the peripheral wall 214 in the height direction is longer than the length of the peripheral wall 214 in the thickness direction.

The lid 220 closes the opening 211 of the case main body 210. The lid 220 is connected to the opening 211 by welding or the like. The lid 220 is formed in a flat plate shape. The lid 220 is made of metal such as aluminum. The lid 220 includes a lid main body 222, an inversion plate 224, and a protrusion 226.

The lid main body 222 is connected to the case main body 210 by welding or the like. The lid main body 222 is formed with a pressure release valve 222*a*, a liquid injection hole 222*b*, a sealing member 222*c*, and a pair of pin insertion holes 222*d*.

The pressure release valve 222*a* is formed at the center of the lid main body 222. The pressure release valve 222*a* is formed so as to break when the internal pressure of the cell case 200 becomes equal to or higher than a predetermined pressure. When the pressure release valve 222*a* breaks, the gas in the cell case 200 is released to the outside of the cell case 200 through the pressure release valve 222*a*, so that the internal pressure of the cell case 200 decreases.

The liquid injection hole 222*b* is a through hole for injecting the electrolyte solution into the cell case 200 in the manufacturing process of the power storage cell 1.

The sealing member 222*c* seals the liquid injection hole 222*b*. After the electrolyte solution is injected into the case main body 210, the liquid injection hole 222*b* is sealed by the sealing member 222*c*.

The pair of pin insertion holes 222*d* are formed at intervals in the width direction. Each pin insertion hole 222*d* is a through hole through which a coupling pin 420 described later is inserted.

Figure 4:
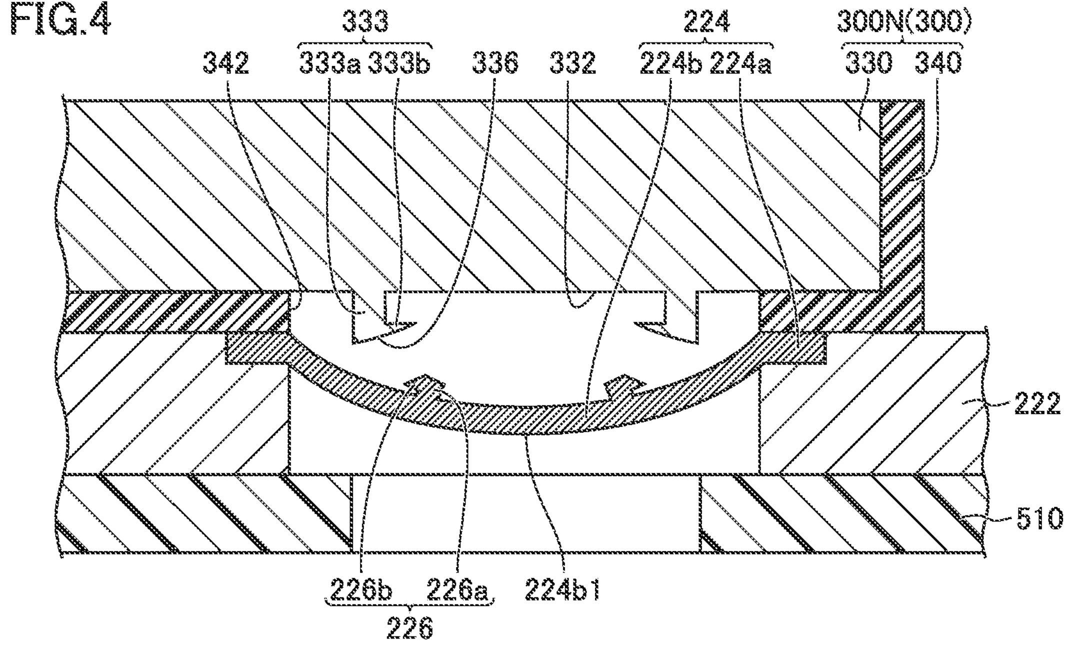
FIG. 4 is an enlarged cross-sectional view of the vicinity of an inversion plate.

The inversion plate 224 is connected to the lid main body 222 by welding or the like. The inversion plate 224 can short-circuit the lid main body 222 and the external terminal 300. As shown in FIG. 4, the inversion plate 224 includes a base portion 224*a* and an inversion portion 224*b*.

The base portion 224*a* is connected to the lid main body 222 by welding or the like. In the present embodiment, the base portion 224*a* is connected to a portion of the lid main body 222 located below the negative electrode terminal plate 330 described later. The base portion 224*a* is formed in an annular shape, more specifically, in an annular shape.

Figure 5:
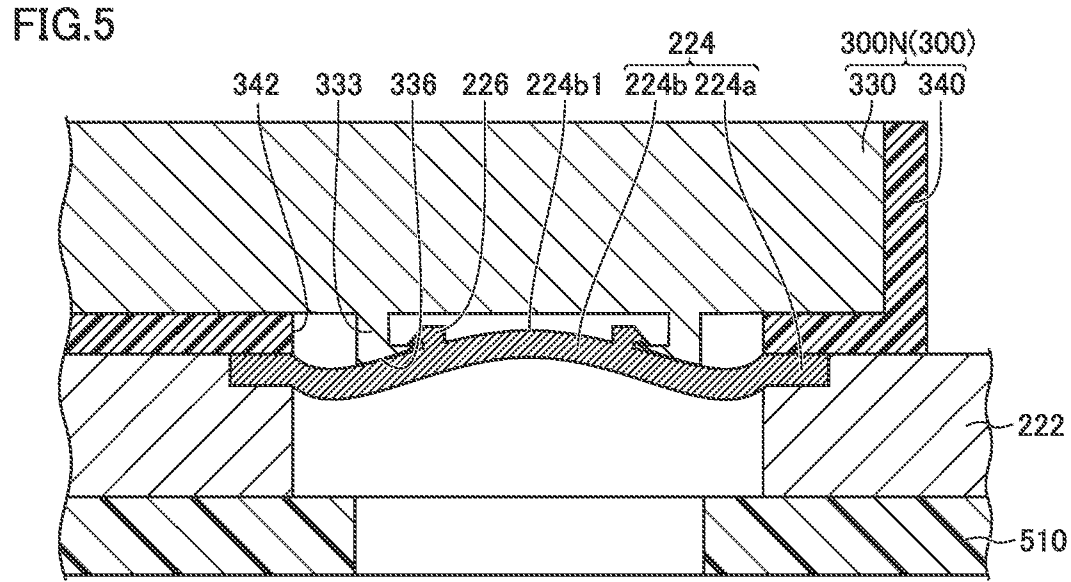
FIG. 5 is a cross-sectional view schematically showing a state after an operation of the inversion plate.

The inversion portion 224*b* is connected to the inside of the base portion 224*a*. The inversion portion 224*b* is formed in a disk shape. The inversion portion 224*b* is deformable between a steady-state shape (a shape shown in FIG. 4) which is curved so as to be convex in a direction away from the negative electrode terminal plate 330 and an inversion shape (a shape shown in FIG. 5) which is curved so as to be convex toward the negative electrode terminal plate 330 and comes into contact with the negative electrode terminal plate 330. When the internal pressure of the cell case 200 is less than a predetermined pressure (normal time), the inversion portion 224*b* exhibits a steady-state shape as shown in FIG. 4. When the internal pressure of the cell case 200 becomes equal to or higher than a predetermined pressure, the inversion portion 224*b* deforms from a steady-state shape to an inversion shape, as shown in FIG. 5. Thereby, the inversion portion 224*b* comes into contact with the negative electrode terminal plate 330.

The protrusion 226 is connected to the inversion plate 224. More specifically, the protrusion 226 has a shape protruding from the upper surface of the inversion portion 224*b* toward the negative electrode terminal plate 330. The protrusion 226 constitutes a part of a regulation portion that regulates deformation of the inversion portion 224*b* from the inversion shape to the steady-state shape, i.e., re-inversion of the inversion portion 224*b*. The protrusion 226 includes a rising piece 226*a* and a claw portion 226*b*.

The rising piece 226*a* rises from a portion of the inversion plate 224 sandwiching the top portion 224*b*1 of the inversion plate 224 toward the negative electrode terminal plate 330.

The claw portion 226*b* protrudes from the upper end portion of the rising piece 226*a* in a direction away from the top portion 224*b*1 of the inversion plate 224 (outward in the width direction).

The external terminal 300 is fixed to the upper surface of the cell case 200. A bus bar (not shown) is connected to the external terminal 300 by welding or the like. The external terminal 300 includes a positive electrode member 300P and a negative electrode member 300N.

The positive electrode member 300P is connected to the upper surface of the cell case 200 by welding or the like. The positive electrode member 300P includes a positive electrode terminal plate 310 and a terminal block 320.

The positive electrode terminal plate 310 is formed in a rectangular parallelepiped shape. The positive electrode terminal plate 310 is made of a metal such as aluminum.

The terminal block 320 is formed in a rectangular parallelepiped shape. The terminal block 320 is made of a metal (e.g., iron) different from the metal constituting the positive electrode terminal plate 310. The terminal block 320 is connected to the upper surface of the lid main body 222 by welding, and the positive electrode terminal plate 310 is connected to the upper surface of the terminal block 320 by welding or the like. That is, the case main body 210 and the lid 220 are electrically connected to the positive electrode terminal plate 310 via the terminal block 320, and are charged to the same polarity as the positive electrode terminal plate 310. Each of the positive electrode terminal plate 310 and the terminal block 320 is formed with a through hole through which a positive electrode coupling pin 420P described later is inserted.

The negative electrode member 300N is connected to the upper surface of the cell case 200 by welding or the like. The negative electrode member 300N is spaced apart from the positive electrode member 300P in the width direction. The negative electrode member 300N includes a negative electrode terminal plate 330 and an insulating plate 340.

The negative electrode terminal plate 330 is formed in a substantially rectangular parallelepiped shape. The negative electrode terminal plate 330 is disposed above the inversion plate 224. As shown in FIG. 4, the negative electrode terminal plate 330 has an opposing portion 332 opposed to the inversion plate 224. The opposing portion 332 is formed flat.

In this embodiment, the negative electrode terminal plate 330 has a holding portion 333. The holding portion 333 has a shape protruding from the opposing portion 332 toward the inversion plate 224. The holding portion 333 is separated from the protrusion 226 when the inversion plate 224 is in a steady-state shape, and holds the protrusion 226 when the inversion plate 224 is in an inversion shape. That is, the holding portion 333, together with the protrusion 226, constitutes the regulating portion that regulates the reversion of the inversion plate 224. The holding portion 333 may be formed in an annular shape, or may have a pair of holding elements arranged at positions sandwiching the top portion 224*b*1 of the inversion portion 224*b* in the width direction. The holding portion 333 includes a protruding portion 333*a* and a holding claw 333*b*.

The protruding portion 333*a* protrudes toward the inversion plate 224 from a position sandwiching a portion of the opposing portion 332 opposed to the top portion 224*b*1 of the inversion plate 224.

The holding claw 333*b* protrudes from the lower end portion of the protruding portion 333*a* toward the portion of the opposing portion 332 facing the top portion 224*b*1.

As shown in FIGS. 4 and 5, the holding portion 333 has a contact surface 336 having a shape conforming to the outer shape of the inversion plate 224 in the inversion shape. As described above, when the internal pressure of the cell case 200 is less than the predetermined pressure (normal time), the inversion portion 224*b* of the inversion plate 224 is separated from the contact surface 336. By the inversion of the inversion portion 224*b*, the claw portion 226*b* of the protrusion 226 engages with the holding claw 333*b* of the holding portion 333 from inside in the width direction.

The insulating plate 340 is fixed to the upper surface of the lid 220. The insulating plate 340 holds the negative electrode terminal plate 330. The insulating plate 340 insulates the lid 220 from the negative electrode terminal plate 330. Each of the negative electrode terminal plate 330 and the insulating plate 340 is formed with a through hole through which a negative electrode coupling pin 420N described later is inserted. As shown in FIGS. 3 and 4, the insulating plate 340 has an exposure port 342 for exposing the opposing portion 332.

The coupling member 400 connects the plurality of tabs 110P and 110N to the external terminal 300. The coupling member 400 includes a current collector plate 410 and a coupling pin 420.

The current collector plate 410 is connected to a plurality of tabs. The current collector plate 410 includes a positive electrode current collector plate 410P and a negative electrode current collector plate 410N.

The positive electrode current collector plate 410P is connected to a plurality of positive electrode tabs 110P by welding or the like. The positive electrode current collector plate 410P includes a first flat plate portion 411 and a second flat plate portion 412.

A plurality of positive electrode tabs 110P are connected to the first flat plate portion 411 by ultrasonic welding or the like. A through hole is formed in the first flat plate portion 411. The plurality of positive electrode tabs 110P are connected to the lower surface of the first flat plate portion 411. However, the plurality of positive electrode tabs 110P may be connected to the upper surface of the first flat plate portion 411.

The second flat plate portion 412 is disposed outside the first flat plate portion 411 in the width direction. A coupling hole 412*h* and a fuse portion 412*a* are formed in the second flat plate portion 412. The fuse portion 412*a* is formed by a through hole penetrating the second flat plate portion 412 in the thickness direction. As shown in FIG. 3, a thin portion may be formed between the second flat plate portion 412 and the first flat plate portion 411.

The negative electrode current collector plate 410N is connected to a plurality of negative electrode tabs 110N by welding or the like. The configuration of the negative electrode current collector plate 410N is substantially the same as the configuration of the positive electrode current collector plate 410P.

The coupling pin 420 connects the current collector plate 410 and the external terminal 300. The coupling pin 420 includes a positive electrode coupling pin 420P and a negative electrode coupling pin 420N.

The positive electrode coupling pin 420P connects the positive electrode current collector plate 410P and the positive electrode terminal plate 310. The positive electrode coupling pin 420P is formed in a cylindrical shape. The lower end portion of the positive electrode coupling pin 420P is connected to the second flat plate portion 412 in a state of being inserted into the coupling hole 412*h*. The upper end of the positive electrode coupling pin 420P is caulked to the positive electrode terminal plate 310.

The negative electrode coupling pin 420N connects the negative electrode current collector plate 410N and the negative electrode terminal plate 330. The negative electrode coupling pin 420N is formed in a cylindrical shape. The lower end portion of the negative electrode coupling pin 420N is connected to the second flat plate portion 412 in a state of being inserted into the coupling hole 412*h*. The upper end of the negative electrode coupling pin 420N is caulked to the negative electrode terminal plate 330.

The insulating member 500 insulates the coupling member 400 from the cell case 200. The insulating member 500 includes an insulating sheet 510 and an insulator 520.

The insulating sheet 510 is connected to the lower surface of the lid main body 222. A through hole is formed in a portion of the insulating sheet 510 which overlaps the pressure release valve 222*a* in the height direction, a portion which overlaps the liquid injection hole 222*b*, a portion which overlaps the pin insertion hole 222*d*, and a portion which overlaps the inversion plate 224.

The insulator 520 has a shape surrounding the coupling pin 420, and insulates the coupling pin 420 from the cell case 200. The insulator 520 includes a positive electrode side insulator 520P and a negative electrode side insulator 520N.

The positive electrode side insulator 520P covers the positive electrode coupling pin 420P. The positive electrode side insulator 520P is formed in a cylindrical shape. The positive electrode side insulator 520P insulates the positive electrode coupling pin 420P from the lid main body 222.

The negative electrode side insulator 520N covers the negative electrode coupling pin 420N. The structure of the negative electrode side insulator 520N is the same as the structure of the positive electrode side insulator 520P.

In the power storage cell 1 described above, when the internal pressure of the cell case 200 rises to the predetermined pressure or higher due to the occurrence of an abnormality in the electrode assembly 100 or the like, as shown in FIG. 5, the inversion portion 224*b* of the inversion plate 224 is inverted (deformed from a steady-state shape to an inversion shape) to contact the contact surface 336 of the negative electrode terminal plate 330. Thus, since the external terminal 300, the coupling member 400, and the electrode assembly 100 form a closed circuit through the lid 220, a large current flows through the circuit. Then, the fuse portion 412*a* formed in the second flat plate portion 412 is fused. As a result, the electrical connection between the electrode assembly 100 and the cell case 200 is interrupted.

Here, when the inversion plate 224 is inverted (deformed from the steady-state shape to the inversion shape), as shown in FIG. 5, since the protrusion 226 is held by the holding portion 333, deformation of the inversion plate 224 from the inversion shape to the steady-state shape, i.e., reversion of the inversion plate 224 is suppressed.

Hereinafter, modified examples of the above embodiment will be described.

First Modified Example

Figure 6:
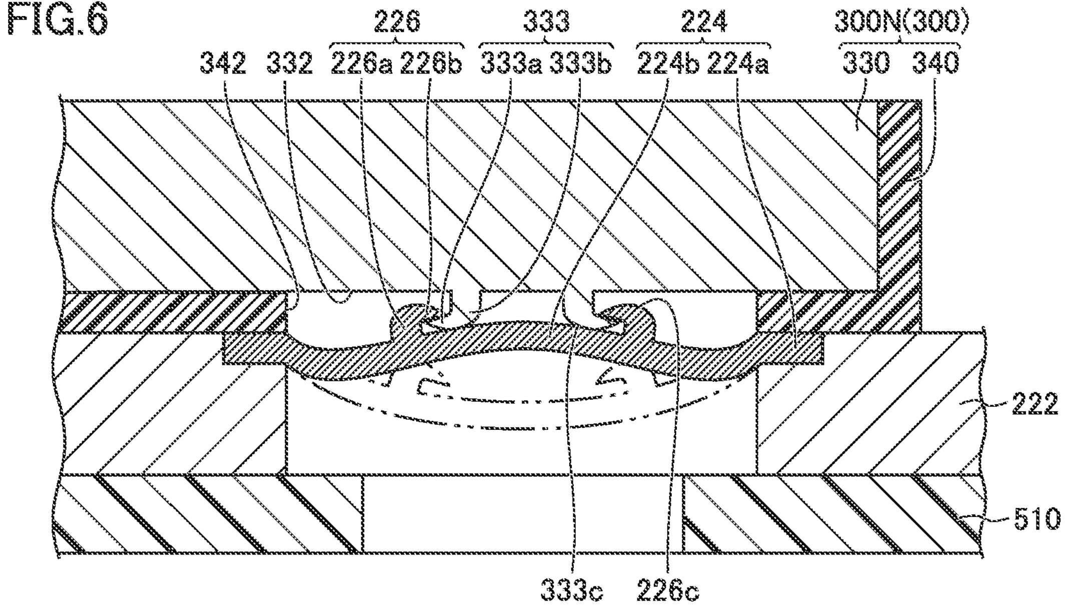
FIG. 6 is an enlarged cross-sectional view of the vicinity of an inversion plate in a modified example.

As shown in FIG. 6, the claw portion 226*b* of the protrusion 226 protrudes from the upper end portion of the rising piece 226*a* toward the top portion of the inversion plate 224. The holding claw 333*b* of the holding portion 333 protrudes from the lower end portion of the protruding portion 333*a* in a direction away from the portion of the opposing portion 332 facing the top portion of the inversion plate 224. In this example, by the inversion of the inversion portion 224*b*, the claw portion 226*b* engages with the holding claw 333*b* from the outside in the width direction. In FIG. 6, the inversion plate 224 and the protrusion 226 in a steady-state shape are indicated by a two-dot chain line.

Further, in this example, when the inversion plate 224 attempts to return from the inversion shape to the steady-state shape, the protrusion 226 tends to deform in a direction approaching the holding portion 333. Therefore, the reversion of the inversion plate 224 is more reliably suppressed.

The rising piece 226*a* has an upper end surface 226*c* which is curved so as to be convex upward. The protruding portion 333*a* has a lower end surface 333*c* which is curved to be convex downward. Therefore, the rising piece 226*a* is prevented from interfering with the protruding portion 333*a* at the time of inversion of the inversion portion 224*b*.

Second Modified Example

Figure 7:
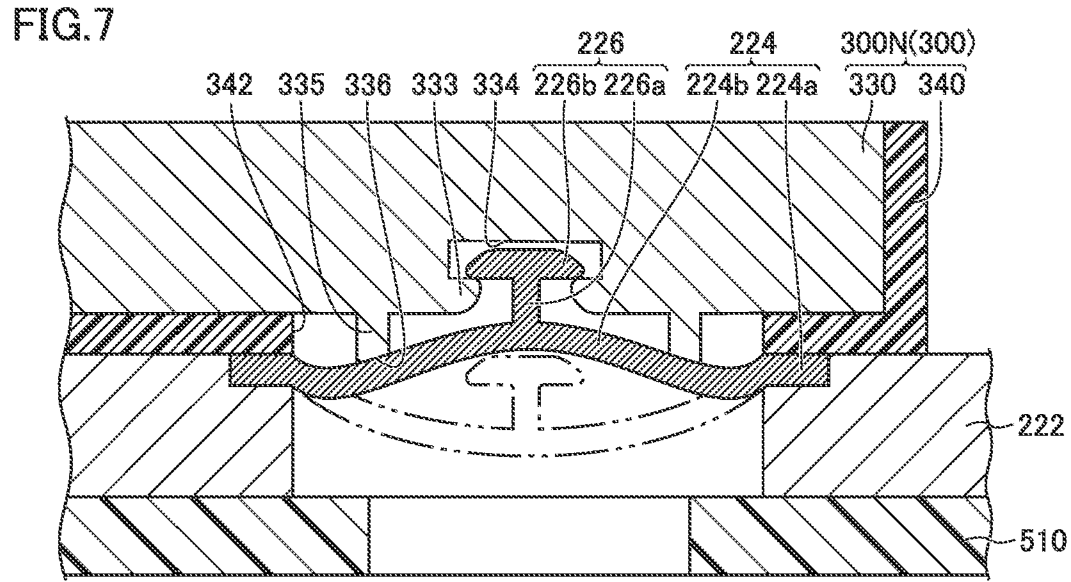
FIG. 7 is an enlarged cross-sectional view of the vicinity of an inversion plate in a modified example.

As shown in FIG. 7, the rising piece 226*a* of the protrusion 226 projects upward from the top of the inversion portion 224*b*. The claw portion 226*b* has a shape protruding from the upper end portion of the rising piece 226*a* in a direction (for example, the width direction) orthogonal to the axial direction of the rising piece 226*a*. In FIG. 7, the inversion plate 224 and the protrusion 226 in a steady-state shape are indicated by a two-dot chain line.

A recessed portion 334 is formed in the opposing portion 332 of the negative electrode terminal plate 330 in a direction away from the inversion plate 224, and a holding portion 333 is formed at a lower end portion of the recessed portion 334. The holding portion 333 allows passage of the claw portion 226*b* when the inversion plate 224 deforms from a steady-state shape to an inversion shape. On the other hand, the holding portion 333 prevents the inversion plate 224 in the inversion shape from being deformed toward the steady-state shape by abutting against the claw portion 226*b* when the inversion plate 224 is in the inversion shape.

The length between the outer end portions of the claw portions 226*b* in the width direction is larger than the length between the inner end portions of the holding portions 333 in the width direction. However, when the inversion portion 224*b* is deformed from the steady-state shape to the inversion shape, the claw portion 226*b* is elastically deformed to pass through the holding portion 333. After the claw portion 226*b* passes through the holding portion 333 during the inversion of the inversion portion 224*b*, the claw portion 226*b* abuts on the holding portion 333.

The negative electrode terminal plate 330 has a protruding portion 335 protruding downward from the opposing portion 332, and a lower surface of the protruding portion 335 constitutes a contact surface 336.

It will be appreciated by those skilled in the art that the exemplary embodiments described above are specific examples of the following aspects.

Embodiment 1

A power storage cell comprising:

an electrode assembly;

a cell case that accommodates the electrode assembly; and an external terminal fixed to an upper surface of the cell case, wherein the cell case has

- a case main body that accommodates the electrode assembly, the case main body being provided with an opening that opens upward, and
- a lid connected to the case main body so as to close the opening of the case main body, the lid has

- a lid main body connected to the opening of the case main body and charged positively or negatively in the electrode assembly,
- an inversion plate connected to the lid main body, the inversion plate being able to short-circuit the lid main body and the external terminal, and
- a protrusion protruding from the inversion plate toward the external terminal, the inversion plate is deformable between a steady-state shape and an inversion shape, the steady-state shape being a shape curved to project in a direction away from the external terminal, the inversion shape being a shape curved to project toward the external terminal with the inversion plate being in contact with the external terminal, and the external terminal has a holding portion that is separated from the protrusion when the inversion plate is in the steady-state shape and that holds the protrusion when the inversion plate is in the inversion shape.

In this power storage cell, when the inversion plate is inverted (deformed from the steady-state shape to the inversion shape), since the protrusion is held by the holding portion, deformation of the inversion plate from the inversion shape to the steady-state shape, i.e., reversion of the inversion plate, is suppressed.

Embodiment 2

The power storage cell according to Embodiment 1, wherein the holding portion has a contact surface having a shape along an upper surface of the inversion plate in the inversion shape.

In this aspect, since the contact area between the inversion plate and the external terminal is ensured, the contact resistance between the inversion plate and the external terminal is reduced. Accordingly, heat generation of the inversion plate when the inversion plate is energized is suppressed.

Embodiment 3

The power storage cell according to Embodiment 1, wherein the protrusion has a rising piece rising toward the external terminal from each of portions of the inversion plate sandwiching a top portion of the inversion plate, and a claw portion protruding from an upper end portion of the rising piece toward the top portion side of the inversion plate, the holding portion has a protruding portion protruding toward the inversion plate from each of positions sandwiching a portion of the holding portion facing the top portion of the inversion plate, and a holding claw protruding from a lower end portion of the protruding portion in a direction away from the portion facing the top portion.

In this aspect, when the inversion plate attempts to return from the inversion shape to the steady-state shape, the protrusion tends to deform in a direction approaching the holding portion. Therefore, the reversion of the inversion plate is more reliably suppressed.

Embodiment 4

The power storage cell according to Embodiment 3, wherein the rising piece has an upper end surface having a shape curved to project upward, and the protruding portion has a lower end surface having a shape curved to project downward.

In this aspect, interference of the rising piece with the protruding portion at the time of inversion of the inversion plate is suppressed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage cell comprising:

an electrode assembly;

a cell case that accommodates the electrode assembly; and an external terminal fixed to an upper surface of the cell case, wherein the cell case has a case main body that accommodates the electrode assembly, the case main body being provided with an opening that opens upward, and a lid connected to the case main body so as to close the opening of the case main body, the lid has a lid main body connected to the opening of the case main body and charged positively or negatively in the electrode assembly, an inversion plate connected to the lid main body, the inversion plate being able to short-circuit the lid main body and the external terminal, and a protrusion protruding from the inversion plate toward the external terminal, the inversion plate is deformable between a steady-state shape and an inversion shape, the steady-state shape being a shape curved to project in a direction away from the external terminal, the inversion shape being a shape curved to project toward the external terminal with the inversion plate being in contact with the external terminal, and the external terminal has a holding portion that is separated from the protrusion when the inversion plate is in the steady-state shape and that holds the protrusion when the inversion plate is in the inversion shape.

2. The power storage cell according to claim 1, wherein the holding portion has a contact surface having a shape along an upper surface of the inversion plate in the inversion shape.

3. The power storage cell according to claim 1, wherein the protrusion has a rising piece rising toward the external terminal from each of portions of the inversion plate sandwiching a top portion of the inversion plate, and a claw portion protruding from an upper end portion of the rising piece toward the top portion side of the inversion plate, the holding portion has a protruding portion protruding toward the inversion plate from each of positions sandwiching a portion of the holding portion facing the top portion of the inversion plate, and a holding claw protruding from a lower end portion of the protruding portion in a direction away from the portion facing the top portion.

4. The power storage cell according to claim 3, wherein the rising piece has an upper end surface having a shape curved to project upward, and the protruding portion has a lower end surface having a shape curved to project downward.

* * * * *